(12) United States Patent
Tanaka et al.

(10) Patent No.: US 9,099,757 B2
(45) Date of Patent: Aug. 4, 2015

(54) BATTERY

(75) Inventors: Kenji Tanaka, Kyoto (JP); Kazuaki Matsuo, Kyoto (JP); Kazuhide Tozuka, Kyoto (JP); Kazuya Okabe, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 750 days.

(21) Appl. No.: 13/224,574

(22) Filed: Sep. 2, 2011

(65) Prior Publication Data

US 2012/0058375 A1     Mar. 8, 2012

(30) Foreign Application Priority Data

Sep. 3, 2010 (JP) ................................. 2010-198370
Jul. 22, 2011 (JP) ................................. 2011-160801

(51) Int. Cl.

| H01M 10/05 | (2010.01) |
|---|---|
| H01M 4/64 | (2006.01) |
| H01M 10/0587 | (2010.01) |
| H01M 4/36 | (2006.01) |
| H01M 2/16 | (2006.01) |
| H01M 2/14 | (2006.01) |
| H01M 4/13 | (2010.01) |
| H01M 4/66 | (2006.01) |

(52) U.S. Cl.
CPC .......... *H01M 10/0587* (2013.01); *H01M 2/145* (2013.01); *H01M 2/1646* (2013.01); *H01M 4/13* (2013.01); *H01M 4/366* (2013.01); *H01M 4/664* (2013.01); *H01M 4/667* (2013.01); *Y02E 60/122* (2013.01)

(58) Field of Classification Search
CPC .... H01M 2/145; H01M 2/1646; H01M 4/366
USPC ............................ 429/94, 211, 246, 481, 488
See application file for complete search history.

(56) References Cited

U.S. PATENT DOCUMENTS

| 6,309,777 | B1 | 10/2001 | Ohta et al. | |
|---|---|---|---|---|
| 6,335,114 | B1 | 1/2002 | Ueshima et al. | |
| 2002/0197535 | A1 | 12/2002 | Dudley et al. | |
| 2003/0099880 | A1 | 5/2003 | Park et al. | |
| 2003/0224242 | A1 | 12/2003 | Kaito et al. | |
| 2004/0183215 | A1* | 9/2004 | Fujieda et al. | 257/793 |
| 2004/0202928 | A1 | 10/2004 | Miyamoto et al. | |
| 2006/0188785 | A1* | 8/2006 | Inoue et al. | 429/246 |
| 2006/0204836 | A1 | 9/2006 | Kaito et al. | |
| 2006/0204837 | A1 | 9/2006 | Kaito et al. | |
| 2007/0048613 | A1 | 3/2007 | Yanagida et al. | |
| 2007/0122715 | A1 | 5/2007 | Fujino et al. | |
| 2007/0224493 | A1 | 9/2007 | Higuchi et al. | |
| 2008/0003503 | A1 | 1/2008 | Kawakami et al. | |
| 2008/0118826 | A1 | 5/2008 | Shimamura et al. | |
| 2008/0311479 | A1 | 12/2008 | Lee et al. | |
| 2009/0111011 | A1 | 4/2009 | Kim et al. | |
| 2010/0136394 | A1 | 6/2010 | Miyahisa et al. | |
| 2010/0188048 | A1 | 7/2010 | Nishino et al. | |
| 2010/0203396 | A1 | 8/2010 | Murata | |
| 2010/0221607 | A1 | 9/2010 | Hatanaka et al. | |
| 2013/0260207 | A1 | 10/2013 | Uemura | |

FOREIGN PATENT DOCUMENTS

| EP | 0 523 840 B1 | 4/1996 |
|---|---|---|
| EP | 2 192 639 A1 | 6/2010 |
| JP | 08-050917 | 2/1996 |
| JP | 9-219199 A | 8/1997 |
| JP | 2954147 B1 | 7/1999 |
| JP | 11-214036 A | 8/1999 |
| JP | 2001-210304 A | 3/2001 |
| JP | 2001-93583 A | 4/2001 |
| JP | 2001-093583 A | 4/2001 |
| JP | 2003-151535 A | 5/2003 |
| JP | 2003-168417 A | 6/2003 |
| JP | 2004-055537 A | 2/2004 |
| JP | 2004-063343 A | 2/2004 |
| JP | 2004-095382 A | 3/2004 |
| JP | 2004-259625 A | 9/2004 |
| JP | 2005-509247 A | 4/2005 |
| JP | 2006-24464 A | 1/2006 |
| JP | 2006-173001 A | 6/2006 |
| JP | 2007-095656 A | 4/2007 |
| JP | 2007-103356 A | 4/2007 |
| JP | 2007-258050 A | 10/2007 |
| JP | 2007-273114 A | 10/2007 |
| JP | 2009-032668 A | 2/2009 |
| JP | 2009-38016 A | 2/2009 |
| JP | 2009-110928 A | 5/2009 |
| JP | 2009-518808 A | 5/2009 |

(Continued)

OTHER PUBLICATIONS

European Search Report dated Nov. 26, 2013, in EP Application No. 11177938.5.

(Continued)

*Primary Examiner* — Ladan Mohaddes
(74) *Attorney, Agent, or Firm* — McGinn IP Law Group, PLLC

(57) ABSTRACT

Provided is a battery which has less tendency to experience delamination or loss of short circuit prevention layer and/or active material layer during manufacture and use.

A battery comprising a laminated electrode assembly in which a positive electrode, a negative electrode, and a separator are laminated together; wherein an alumina-containing layer containing γ-alumina particles is formed on at least one species selected from among the group consisting of the positive electrode, the negative electrode, and the separator. The fact that alumina-containing layer(s) is or are made to contain γ-alumina particles makes it possible to obtain high bond strength between alumina-containing layer(s) and electrode(s) comprising metal(s), current collector(s) and/or active material(s) making up electrode(s), and/or separator(s).

20 Claims, 10 Drawing Sheets

(56) References Cited

FOREIGN PATENT DOCUMENTS

| | | |
|---|---|---|
| JP | 2010-113819 A | 5/2010 |
| JP | 4789274 B2 | 10/2011 |
| WO | WO 02/101854 A2 | 12/2002 |
| WO | WO2005/067080 A1 | 7/2005 |
| WO | WO2006/064344 A2 | 6/2006 |
| WO | WO2009/001502 A1 | 12/2008 |
| WO | WO 2012/081543 A1 | 6/2012 |

OTHER PUBLICATIONS

United States Office Action dated May 16, 2014 in U.S. Appl. No. 13/318,000.

* cited by examiner

BATTERY

FIELD OF INVENTION

The present invention relates to a wound electrode battery or other such laminated battery, and more particularly, relates to a laminated battery wherein one or more of the positive electrode, negative electrode, and/or separator comprise an alumina-containing layer.

BACKGROUND

Wound-electrode batteries and other such laminated batteries are commonly employed in electric automobiles, hybrid cars, and other such applications where high density and high output are sought. Laminated batteries include those in which sheet-like positive electrode(s), negative electrode(s), and separator(s) are layered together to form a multilayer electrode assembly; and those in which strip-like positive electrode(s), negative electrode(s), and separator(s) are laminated together in spiral fashion to form a wound electrode assembly.

Positive electrodes and negative electrodes include those comprising only metal foil (e.g., the negative electrode in a lithium battery), those in which an active material layer is formed on a current collector comprising metal foil, and those in which a current collector comprising metal foam is filled with active material. Even electrodes having active material will have a portion, usually at an edge thereof, where the metal current collector is exposed, being uncoated with active material, for connection to a current collector tab for extraction of electricity or for direct connection to a current collector terminal. In the event that this exposed metal portion forms a short circuit with the exposed metal portion of the other electrode or with the active material layer thereof, this will cause a large current to flow, and there is a possibility that the heat that is generated as a result will cause damage to the battery. The two neighboring electrodes are arranged in opposing fashion such that the separator intervenes therebetween, and it is possible for a short circuit to occur in such situations as when there is skewed takeup during winding or when powder that has delaminated from the electrode due to droppage or vibration during transport or use bridges the separator.

To prevent this, Patent Reference No. 1 discloses an invention in which a short circuit prevention layer is provided adjacent to the active material layer at a region uncoated with active material on the current collector foil. Furthermore, to permit lithium ions discharged from positive electrode active material to be smoothly stored within negative electrode active material during charging, nonaqueous electrolyte secondary batteries are currently designed such that the negative electrode active material layer is larger than the positive electrode active material layer and is arranged in opposing fashion with respect to the entire positive electrode active material layer. This being the case, there will necessarily be a location at which a region uncoated with active material at the positive electrode current collector foil and a region coated with active material at the negative electrode are arranged in opposing fashion such that the separator intervenes therebetween. Patent References Nos. 2 and 3 disclose inventions in which an insulating layer is formed at a portion of a region uncoated with active material at the positive electrode which is arranged in opposing fashion with respect to a region coated with active material at the negative electrode such that the separator intervenes therebetween. Furthermore, Patent Reference No. 4 discloses an invention in which a short circuit prevention layer is made noninsulating.

Patent References Nos. 5 through 7 disclose a number of compositions, such as those containing alumina or polyvinylidene difluoride (PVDF), for short circuit prevention layers.

PATENT REFERENCE NO. 1: Japanese Patent Application Publication Kokai No. 2001-93583
PATENT REFERENCE NO. 2: Japanese Patent Application Publication Kokai No. 2004-259625
PATENT REFERENCE NO. 3: Japanese Patent Application Publication Kokai No. 2004-55537
PATENT REFERENCE NO. 4: Japanese Patent Application Publication Kokai No. 2007-95656
PATENT REFERENCE NO. 5: International Patent Application Publication No. 05/067080
PATENT REFERENCE NO. 6: Japanese Patent Application Publication Kokai No. 2007-103356
PATENT REFERENCE NO. 7: International Patent Application Japanese Translation Publication No. 2009-518808

Problem to be Solved

However, even where a short circuit prevention layer was provided at the design stage, there have still been occasions in which delamination or loss of the short circuit prevention layer or active material layer occurred at such times during manufacturing operations as when winding the separator and foil electrodes, when compressing the wound electrode assembly into a more flattened profile, or during handling of the electrode assembly. Furthermore, there has also been the problem of delamination or loss of the short circuit prevention layer and/or active material layer due to droppage, vibration, and so forth during battery use.

The present invention was conceived upon consideration of the foregoing points, it being an object thereof to provide a battery which has less tendency to experience delamination or loss of short circuit prevention layer and/or active material layer during manufacture and use.

SUMMARY

A battery in accordance with one embodiment of the present invention is characterized in that it comprises a laminated electrode assembly in which a positive electrode, a negative electrode, and a separator are laminated together; wherein an alumina-containing layer containing γ-alumina particles is formed on at least one species selected from among the group consisting of the positive electrode, the negative electrode, and the separator.

BENEFIT OF INVENTION

The fact that, in accordance with one embodiment of the present invention, alumina-containing layer(s) is or are made to contain γ-alumina particles makes it possible to obtain high bond strength between alumina-containing layer(s) and electrode(s) comprising metal(s), current collector(s) and/or active material(s) making up electrode(s), and/or separator(s). This being the case, where an alumina-containing layer functions as a layer for prevention of short circuit between electrodes, it will be possible to achieve the benefit of reduced tendency to experience delamination and/or loss of the short circuit prevention layer during manufacture and use of the battery. Furthermore, where an alumina-containing layer is formed between an electrode current collector foil and an active material layer, it will be possible to achieve the benefit of reduced tendency to experience delamination and/or loss of the active material layer.

DETAILED DESCRIPTION

A first embodiment of the present invention will be described in terms of the example of a wound lithium ion secondary battery comprising an electrode assembly in which a positive electrode having a positive electrode active material layer on a current collector foil and a negative electrode having a negative electrode active material layer on a current collector foil are laminated together in spiral fashion such that a separator intervenes therebetween, wherein an alumina-containing layer is formed so as to be adjacent to and in direct contact with the positive electrode active material layer on the positive electrode current collector foil. In the present embodiment, the alumina-containing layer functions as a short circuit prevention layer.

Figure 2:
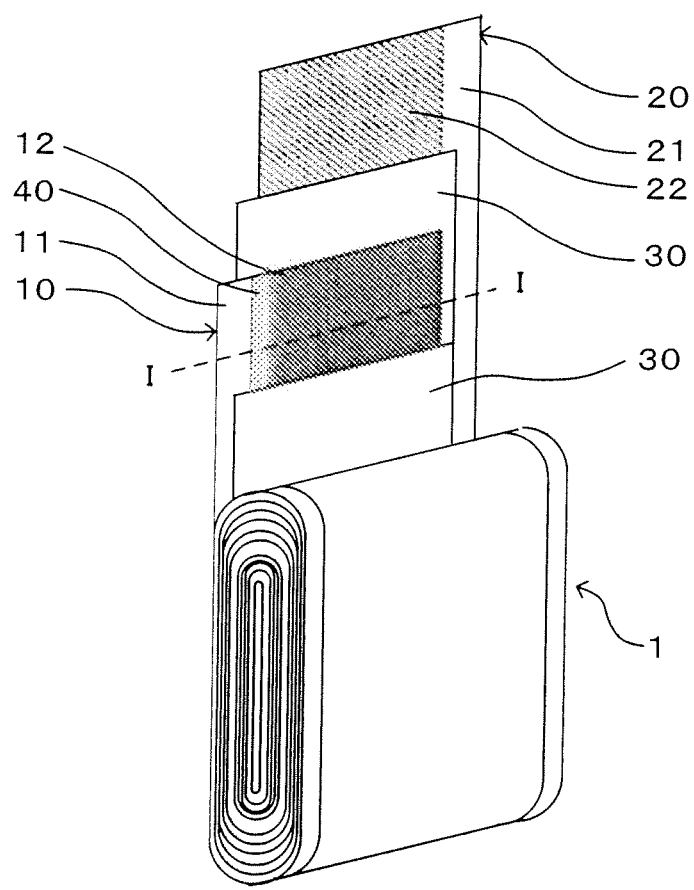
FIG. 2 is a drawing showing a wound electrode assembly associated with one embodiment of the present invention.

FIG. 2 shows the structure of a wound electrode assembly 1 in a battery associated with the present embodiment. Strip-like positive electrode 10 and strip-like negative electrode 20 are laminated together in spiral fashion such that strip-like separator 30 intervenes therebetween. Positive electrode 10 has positive electrode active material layer 12 and alumina-containing layer 40 on each face of positive electrode current collector foil 11, and negative electrode 20 has negative electrode active material layer 22 on each face of negative electrode current collector foil 21.

Figure 3:
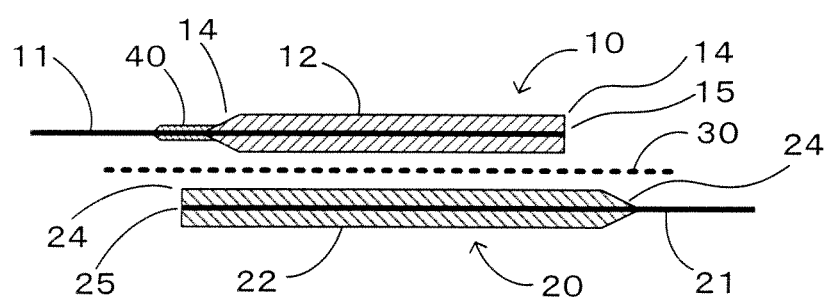
FIG. 3 is a drawing showing cross-sectional structure at a portion corresponding to a wound electrode assembly associated with one embodiment of the present invention.

FIG. 3 shows the structure of the positive electrode, negative electrode, and separator at the section indicated by I-I in FIG. 2. In the present embodiment, the component at which alumina-containing layer 40 is formed is positive electrode 10, which has metal positive electrode current collector foil 11 and positive electrode active material layer 12. Alumina-containing layer 40 is formed so as to be adjacent to and in direct contact with active material layer 12 and in direct contact with the surface of current collector foil 11, and is disposed so as to face, by way of intervening separator 30, the edge 25 of current collector foil 21 and active material layer 22 of negative electrode 20, with which it is in mutually neighboring relationship by way of intervening separator 30.

Figure 1:
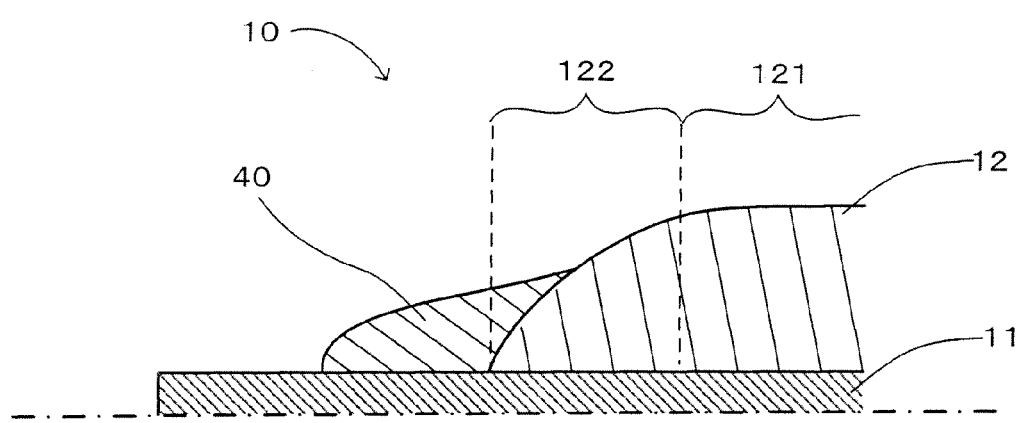
FIG. 1 is a sectional view of a positive electrode associated with one embodiment of the present invention.

FIG. 1 shows an enlarged view of a location near the side edge of positive electrode current collector foil 11 in FIG. 3. Note that FIG. 1 shows the situation at only one face of current collector foil 11, and note further that the drawing is not to scale. In the present embodiment, positive electrode active material layer 12 has bulk zone 121, which has more or less constant thickness; and tapered zone 122, where thickness tapers off at the end portion. Moreover, alumina-containing layer 40 is applied to positive electrode current collector foil 11 in such fashion as to overlap this tapered end zone 122.

Alumina-containing layer 40 will first be described.

As material for the alumina-containing layer, mixtures of binder(s) with organic and/or inorganic microparticles may be employed. In the present embodiment, the foregoing microparticles include at least γ-alumina particles. This makes it possible to improve adhesion and bond strength between the alumina-containing layer and other substances such as the current collector foil and/or the adjacent active material layer.

While there is no particular limitation with respect to particle diameter of γ-alumina particles, it is preferred that those employed have a primary particle diameter median value of 1 nm to 100 nm. From the standpoint of adhesion and bond strength with respect to current collector foil and active material layer, it is more preferred that primary particle diameter median value be 1 nm to 10 nm, and particularly preferred that this be 1 nm to 7 nm. As used herein, primary particle diameter median value refers to the median diameter obtained when 10 primary particles are observed under transmission electron microscopy.

While there is no particular limitation with respect to tap density of γ-alumina particles, it is preferred that those employed have a tap density of 0.02 g/cm$^3$ to 0.9 g/cm$^3$. From the standpoint of adhesion and bond strength with respect to current collector foil and active material layer, it is more preferred that tap density be 0.02 g/cm$^3$ to 0.6 g/cm$^3$. As used herein, tap density refers to powder bulk density obtained by tapping on the container under prescribed conditions (JIS R1600).

While there is no particular limitation with respect to specific surface area of γ-alumina particles, it is preferred that those employed have a specific surface area of not less than 96 m$^2$/g. From the standpoint of adhesion and bond strength with respect to current collector foil and/or active material layer, it is more preferred that specific surface area be 96 m$^2$/g to 234 m$^2$/g. As used herein, specific surface area refers to a value obtained in accordance with the Brunauer, Emmett, and Teller (BET) method involving adsorption of an inert gas.

As binder for the alumina-containing layer, polyvinylidene difluoride (PVDF), polytetrafluoroethylene (PTFE), polyimide, polyamide-imide, and so forth may, for example, be employed. Of these, from the standpoint of adhesion and bond strength with respect to current collector foil and/or active material layer, it is preferred that PVDF be employed. Furthermore, it is preferred that PVDF resin content be not less than 45 wt % and not more than 60 wt %.

A suitable amount of electroconductor material may also be added to the alumina-containing layer. The primary function of the alumina-containing layer in the present embodiment is to prevent abnormal generation of heat due to short circuit between the negative electrode and the current collector foil of the positive electrode. As a result of making the alumina-containing layer noninsulating, in the event that a burr or the like produced during manufacture of the positive electrode or negative electrode penetrates the separator, gentle discharge of electricity will occur by way of the alumina-containing layer, permitting prevention of abnormal generation of heat.

Other constituents of positive electrode 10 will next be described.

As current collector foil 11 of positive electrode 10, strip-like foil(s) comprising electron conductor(s) not having adverse effect on the completed battery may be employed. For example, strip-like foil(s) comprising aluminum, titanium, stainless steel, nickel, baked carbon, electrically conductive high molecular weight polymer(s), and/or the like may be employed. Furthermore, it is possible to employ material(s) such as aluminum or the like, the surface of which has been treated with carbon, nickel, titanium, silver, or the like. Of these, it is preferred that an aluminum foil which has excellent oxidation resistance be employed. It is preferred that foil thickness be 12 μm to 25 μm, and more preferred that this be approximately 20 μm.

Positive electrode active material layer 12 has positive electrode active material as primary constituent, and where necessary, may also have electroconductor material, binder, filler, and/or the like added therewithin.

As positive electrode active material, known material(s) that store and/or discharge Li ions may be employed. For example, $LiCoO_2$ or lithium-containing transition metal oxides having an α-$NaFeO_2$ structure in which Ni, Mn, or another transition metal or boron is partially substituted for the foregoing Co; compounds having a spinel-type crystal structure as represented by $LiMn_2O_4$; $LiFePO_4$, $LiFeSO_4$, or polyanionic compounds in which Co, Mn, or the like is partially substituted for the foregoing Fe; or the like may be employed. The positive electrode may also have added therein CuO, $Cu_2O$, $Ag_2O$, CuS, $CuSO_4$, and/or other such Group I metal compounds; $TiS_2$, $SiO_2$, SnO, and/or other such Group IV metal compounds; $V_2O_5$, $V_6O_{12}$, $Vo_x$, $Nb_2O_5$, $Bi_2O_3$, $Sb_2O_3$, and/or other such Group V metal compounds; $CrO_3$, $Cr_2O_3$, $MoO_3$, $MoS_2$, $WO_3$, $SeO_2$, and/or other such Group VI metal compounds; $MnO_2$, $Mn_2O_3$, and/or other such Group VII metal compounds; $Fe_2O_3$, FeO, $Fe_3O_4$, $FePO_4$, $Ni_2O_3$, NiO, $CoO_3$, CoO, and/or other such Group VIII metal compounds; and/or the like. Moreover, disulfidic, polypyrrolic, polyanilinic, polyparaphenylenic, polyacetylenic, polyacenic materials, and/or other such electrically conductive high molecular weight polymer compounds; carbonaceous materials having pseudo-graphitic structures; and/or the like may be employed.

As electroconductor material, electron conductor materials not having adverse effect on battery performance may be employed. For example, natural graphite (crystalline graphite, flake graphite, amorphous graphite, etc.), artificial graphite, carbon black, acetylene black, Ketchen black, carbon whiskers, carbon fibers, metal (copper, nickel, aluminum, silver, gold, etc.) powder, metal fibers, electrically conductive ceramic materials and/or other such electrically conductive materials may be contained therein singly or in combination. It is preferred from the standpoints of electrical conductivity and coatability that acetylene black be employed. It is preferred that this be present in an amount that is 1 wt % to 50 wt % of the positive electrode active material, and more preferred that this be present in an amount that is 2 wt % to 30 wt % thereof.

As binder for the positive electrode, any one of polytetrafluoroethylene (PTFE), polyvinylidene difluoride (PVDF), polyethylene, polypropylene, ethylene-propylene-diene terpolymer (EPDM), sulfonated EPDM, styrene-butadiene rubber (SBR), fluorocarbon rubber, carboxymethylcellulose, and/or other such thermoplastic resins, elastomeric polymers, polysaccharides and so forth may be employed singly or two or more thereof may be employed in combination. Furthermore, when employing a binder having functional group(s) that react with lithium such as polysaccharide, it is desirable to carry out methylation or the like, for example, so as to deactivate the functional group(s). It is preferred that this be present in an amount that is 1 wt % to 50 wt % of the positive electrode active material, and more preferred that this be present in an amount that is 2 wt % to 30 wt % thereof.

As filler, materials not having adverse effect on battery performance may be employed. For example, polypropylene, polyethylene, and/or other such olefinic polymers, Aerosil (registered trademark of Evonik Degussa GmbH of Hanau-Wolfgang, Germany) fumed silica and/or other such pyrogenic oxide materials, zeolite, glass, carbon, and/or the like may be employed. It is preferred that filler be present in an amount that is 0 wt % to 30 wt % of the positive electrode active material.

The negative electrode, separator, and electrolyte will next be described.

As the negative electrode current collector, besides copper, nickel, iron, stainless steel, titanium, aluminum, baked carbon, electrically conductive high molecular weight polymer(s), electrically conductive glass(es), Al—Cd alloy(s), and/or the like, it is also possible to employ material(s) such as copper or the like, the surface of which has been treated with carbon, nickel, titanium, silver, or the like so as to improve adhesion, electrical conductivity, and oxidation resistance. Of these, iron foils, nickel foils, and copper foils, which are inexpensive, excel in electrical conductivity, and are stable at reduction sites, or foils comprising alloy(s) of any subset of these, may be favorably employed. When using copper foil, thickness is typically 7 μm to 15 μm, and material having a thickness of approximately 10 μm may be favorably employed.

Negative electrode active material layer 22 has negative electrode active material as primary constituent, and where necessary, may also have electroconductor material, binder, filler, and/or the like added therewithin.

As negative electrode active material, known material(s) that store and/or discharge Li ions may be employed. For example, lithium titanates having a spinel-type crystal structure, lithium metal, lithium-aluminum, lithium-lead, lithium-tin, lithium-aluminum-tin, lithium-gallium, Wood's alloy, and other such lithium-containing alloys; and also, natural graphite, artificial graphite, amorphous carbon, filamentous carbon, powdered carbon, petroleum-pitch-based carbon, coke-based carbon, and other such carbon materials may be cited.

Moreover, carbon materials may be modified by doping with metal oxides such as tin oxide(s) and/or silicon oxide(s), or by addition of phosphorus and/or boron. Furthermore, graphite may be employed in combination with lithium metal, lithium-containing alloy, or the like; and the carbonaceous materials(s) employed in the present invention may have lithium intercalated therewithin in advance as a result of electrochemical reduction which is carried out in advance.

Examples of electroconductor material, binder, and filler that may be added within the negative electrode active material layer are the same as those that may be added within the positive electrode active material.

Known material(s) may be employed in the separator of the battery. For example, polyolefinic, polyesteric, polyacrylonitrilic, polyphenylene-sulfidic, polyimidic, and/or fluororesinic microporous membrane(s) and/or nonwoven fabric(s) may be employed. Where separator wettability would otherwise be poor, treatment with surface active agent or the like may be carried out.

As electrolyte for the lithium ion battery of the present embodiment, known material(s) may be employed. For example, propylene carbonate, ethylene carbonate, butylene carbonate, chloroethylene carbonate, and other such cyclic carbonates; γ-butyrolactone, γ-valerolactone, propiolactone, and other such cyclic esters; dimethyl carbonate, diethyl carbonate, ethyl methyl carbonate, diphenyl carbonate, and other such chained carbonates; methyl acetate, methyl butyrate, and other such chained esters; tetrahydrofuran and derivatives thereof; 1,3-dioxane, dimethoxyethane, diethoxyethane, methoxyethoxyethane, methyl diglyme, and other such ethers; acetonitrile, benzonitrile, and other such nitriles; dioxalane and derivatives thereof and so forth; and the like may be employed singly or two or more thereof may be employed in combination.

A method for manufacturing the battery of the present embodiment will next be described.

The primary operations are preparation of paste for application of positive electrode compound (hereinafter "positive electrode paste"); applying this to the positive electrode current collector foil; preparation of paste for application of the alumina-containing layer (hereinafter "alumina paste"); applying this to the positive electrode current collector foil; drying, working with a press, and cutting of the positive electrode current collector foil after application of positive electrode paste and alumina paste thereto; preparation of paste for application of negative electrode compound (hereinafter "negative electrode paste"); applying this to the negative electrode current collector foil; drying, working with a press, and cutting of the negative electrode current collector foil after application of negative electrode paste thereto; laminating together and winding of the positive electrode, negative electrode, and separator to manufacture the electrode assembly; housing of the electrode assembly within its external container; and addition of electrolyte.

Electroconductor material, binder, filler, and/or the like may be added as necessary to the positive electrodeactive material to prepare the positive electrode compound, and a suitable amount of solvent is added to the positive electrode compound to prepare the positive electrode paste for application in the form of a coating.

The type and amount of solvent(s) which may be employed during preparation of positive electrode paste may be chosen based upon considerations of viscosity, volatility, paste thixotropy, and so forth. Furthermore, a mixture of two or more solvents may be added thereto. As examples of solvents, N-methyl-2-pyrrolidone (NMP) and other such organic solvents; binder-containing water and other such aqueous solutions; and so forth may be cited. It is preferred that solvent be present in an amount that is 40 wt % to 60 wt % of the positive electrode compound.

Note that there is no particular limitation with regard to the procedure for preparation of the positive electrode paste, so long as the method employed is such as to allow paste ingredients to be mixed uniformly. In preparing the positive electrode paste, besides the method described above in which solvent is added following preparation of the positive electrode compound, it is also possible to employ a method in which constituents of the positive electrode compound are simultaneously mixed with the solvent and added to the positive electrode active material, or a method in which binder is dissolved in solvent in advance and the other constituents are thereafter mixed therewith. Furthermore, because it will permit the electroconductor material to be dispersed more uniformly, it is preferred that the electroconductor material and the solvent be mixed uniformly in advance, and that this thereafter be mixed with the active material.

The positive electrode paste is applied to both faces of the strip-like positive electrode current collector foil. As the method for applying this thereto, the die coating method or the comma coating method may, for example, be employed. At this time, portions are left uncoated at either side edge portion of the current collector foil. Thickness of the positive electrode paste which is applied is such that thickness distribution in the width direction of the current collector foil is within ±5%, and is preferably is within ±3%. Average thickness not including the current collector foil is typically 40 μm to 130 μm per face, or 80 μm to 260 μm for both faces.

At either side edge which is coated in strip-like fashion with positive electrode paste, from a bulk zone (reference numeral 121 in FIG. 1) at which thickness is more or less constant as described above, to the uncoated portion where the current collector foil is exposed, there exists a tapered zone (reference numeral 122 in FIG. 1) at which thickness of the positive electrode compound layer varies gradually. From the standpoint of battery efficiency, it is desirable that the width of the tapered zone be narrow. However, in the present embodiment, because the alumina-containing layer is formed so as to partially overlap the tapered zone but not to overlap the bulk zone, it is preferred that the tapered zone have a certain amount of width. Based upon such considerations as positional accuracy of the current collector foil when carrying out coating to apply the alumina-containing layer, it is preferred that that the width of the tapered zone be not less than 0.2 mm, and it is more preferred that this be not less than 0.5 mm.

Alumina-containing layer constituent(s), i.e., γ-alumina particles, and where necessary, other inorganic and/or organic powder(s), binder(s), and where necessary, electroconductor material(s) and/or other such additive(s) are mixed together, and a suitable amount of solvent is moreover added thereto, to prepare alumina paste for application in the form of a coating.

The type and amount of solvent(s) which may be employed during preparation of alumina paste may be chosen based upon considerations of viscosity, volatility, thixotropy, and so forth. Furthermore, a mixture of two or more solvents may be added thereto. As an example of a solvent, N-methyl-2-pyrrolidone (NMP) may be cited.

Note that there is no particular limitation with regard to the procedure for preparation of the alumina paste, so long as the method employed is such as to allow paste ingredients to be mixed uniformly. For example, solvent may be added following mixture of the foregoing powder, binder, and electroconductor material; powder, binder, electroconductor material, and solvent may be mixed simultaneously; or binder may be dissolved in solvent in advance, with powder and electroconductor material being thereafter mixed therewith.

Next, the alumina paste is applied so as to be adjacent to and in direct contact with either side edge portion of the positive electrode paste layer that was previously applied to both faces of the positive electrode current collector foil. As the method for applying this thereto, as was the case with application of the positive electrode paste, the die coating method or the comma coating method may, for example, be employed. At this time, it is preferred that the alumina paste partially cover the tapered zone of the positive electrode paste layer but not cover the bulk zone thereof. This is so because if the bulk zone is covered, this will cause the combined thickness of the positive electrode paste layer and the alumina paste layer to increase by a corresponding amount, increasing the magnitude of compression at the press operation(s) which follow and causing elongation of the alumina-containing layer, and/or resulting in a situation in which strain remains in that region, impairing bond strength between the alumina-containing layer and the positive electrode active material layer.

Furthermore, between the time that the positive electrode paste is applied and the time that the alumina paste is applied, it is preferred that the positive electrode paste which has been applied be kept at a temperature that never exceeds 100° C. This will allow solvent to remain within the positive electrode paste. In particular where NMP or other such high-boiling-point solvent is used, this will allow most of the solvent to remain within the paste. Where this is the case, upon application of the alumina paste, there will be intermingling at the interface with the positive electrode paste, permitting further increase in bond strength between the alumina-containing layer and the positive electrode active material layer.

Next, the positive electrode on which the positive electrode paste and the alumina paste have been applied is dried at 120° to 180° C. As the drying method, known method(s) may be employed.

Moreover, the dried positive electrode is subjected to working by a press. In the present embodiment, because the positive electrode is strip-like, a roll press may be advantageously employed. As a result of working by the press, the positive electrode active material layer is typically compressed from a thickness of 40 μm to 130 μm per face before working by the press, to a thickness of 25 μm to 80 μm per face after working by the press.

At this time, if thickness at location(s) where the alumina-containing layer is applied (and where this covers the positive electrode active material layer, the thickness from the current collector foil surface to the alumina-containing layer surface) is greater than thickness of the positive electrode active material layer following working by the press, this will mean that a portion of the alumina-containing layer will be subjected to working by the press. Causing appropriate pressure to be applied when the alumina-containing layer is subjected to working by the press has the benefit of improving adhesion between the alumina-containing layer and the current collector foil. However, where the alumina-containing layer is considerably thicker than the active material layer, this will cause large application of pressure when the alumina-containing layer is subjected to working by the press, producing a large amount of deformation, impairing bond strength between the alumina-containing layer and the positive electrode active material layer, and resulting in occurrence of such problems as delamination of the two layers.

Conversely, if thickness at location(s) where the alumina-containing layer is applied is less than thickness of the positive electrode active material layer following working by the press, the alumina-containing layer will not be subjected to working by the press. If the alumina-containing layer contains γ-alumina particles, it will still be possible to obtain good adhesion and high bond strength with respect to the current collector foil even when the alumina-containing layer is not subjected to working by the press. It is preferred that thickness of the alumina-containing layer be 3 μm to 15 μm.

After the strip-like positive electrode has been subjected to working by the press, the current collector foil will be exposed at either side edge portion thereof. The positive electrode is then cut along the long direction centrally in the width direction thereof, and is moreover cut to required size, and is delivered to subsequent operations for manufacture of the battery.

As shown in FIG. 1, alumina-containing layer 40 partially overlaps tapered end zone 122 of active material layer 12 but does not overlap bulk zone 121 of the active material layer, and thickness of alumina-containing layer 40 is smaller than thickness of bulk zone 121 of active material layer 12. As a result of provision of such positional/dimensional relationship, it should be clear that, during the foregoing operation involving working by the press, active material layer 12 will be subjected to working by the press, but alumina-containing layer 40 will not be subjected to working by the press.

Operations for manufacture of the negative electrode are similar to operations for manufacture of the positive electrode.

Electroconductor material, binder, filler, and/or the like may be added as necessary to the negative electrode active material to prepare the negative electrode compound, and a suitable amount of solvent is added to the negative electrode compound to prepare the negative electrode paste for application in the form of a coating.

The type and amount of solvent(s) which may be employed during preparation of the negative electrode paste may be chosen based upon considerations of viscosity, volatility, thixotropy, and so forth. Furthermore, a mixture of two or more solvents may in some cases be added thereto. As an example of a solvent, N-methyl-2-pyrrolidone (NMP) and so forth may be cited. As was the case with the positive electrode paste, note that there is also no particular limitation with regard to the procedure for preparation of the negative electrode paste, so long as the method employed is such as to allow paste ingredients to be mixed uniformly.

The negative electrode paste is applied to both faces of the strip-like negative electrode current collector foil. As the method for applying this thereto, the die coating method may, for example, be employed. At this time, portions are left uncoated at either side edge of the current collector foil. Thickness of the negative electrode paste which is applied is such that thickness distribution in the width direction of the current collector foil is within ±5%, and is preferably is within ±3%. Average thickness is typically 50 μm to 100 μm per face.

Next, the current collector foil on which the negative electrode paste has been applied is dried at 120° to 180° C. As the drying method, known method(s) may be employed.

The dried negative electrode is subjected to working by a press. In the present embodiment, because the negative electrode is strip-like, a roll press may be advantageously employed. As a result of working by the press, thickness of the negative electrode active material layer is typically compressed from 50 μm to 100 μm before working by the press, to 30 μm to 60 μm after working by the press.

After being subjected to working by the press, as was the case with the positive electrode, the negative electrode is then cut along the long direction centrally in the width direction thereof, and is cut to the required length.

The positive electrode and negative electrode manufactured as described above are laminated and wound together such that the separator intervenes therebetween, this is housed within the external container, the foregoing nonaqueous electrolyte is added thereto and allowed to permeate therewithin, and initial charge cycling operations are carried out to permit the secondary lithium ion battery of the present embodiment.

The alumina-containing layer of the present embodiment is capable of functioning as a short circuit prevention layer.

As shown in FIG. 3, alumina-containing layer 40 is formed so as to be in direct contact with the surface of positive electrode current collector foil 11, and is disposed so as to face, by way of intervening separator 30, the edge 25 of current collector foil 21 and active material layer 22 of negative electrode 20, with which it is in mutually neighboring relationship. This makes it possible for alumina-containing layer 40 to function so as to prevent occurrence of short circuit between the negative electrode 20 and the positive electrode current collector foil 11. Moreover, the fact that alumina-containing layer 40 is made to contain γ-alumina particles causes there to be improved bond strength between alumina-containing layer 40 and positive electrode current collector foil 11. This makes it possible to achieve the benefit of reduced tendency to experience delamination and/or loss of alumina-containing layer 40 during manufacture and use of the battery.

Furthermore, there is a greater tendency for edge portions 14, 24 of active material layers 12, 22 to experience delamination and/or loss than would be the case at other locations thereon. At the locations that are cut following application, drying, and working by the press of active material layers 12, 22 on current collector foils 11, 21, i.e., cut portions 15, 25 of electrodes 10, 20, not only does active material tend to delaminate and/or become lost, but there is also a tendency for burrs (unwanted portions protruding beyond nominal edges following cutting) to be produced at these locations on current collector foils 11, 21. This being the case, short circuit will tend to occur at edge portions 14, 24 of active material layers 12, 22 and at cut portions 15, 25 of electrodes 10, 20. Accordingly, as shown in FIG. 3, the fact that alumina-containing layer 40 is formed at a location disposed so as to face, by way of intervening separator 30, edge 25 of negative electrode active material layer 22 and current collector foil 21 permits effective prevention of short circuit between negative electrode 20 and positive electrode current collector foil 11.

The present invention is not limited to the foregoing embodiment.

For example, whereas the foregoing first embodiment was described in terms of the example of a lithium ion battery having an electrode assembly that was wound in spiral fashion, the battery of the present invention may also be such that sheet-like members are employed for the positive electrode, negative electrode, and/or separator, these being layered together to form a multilayer electrode assembly that is not wound in spiral fashion. Furthermore, the battery associated with the present invention may be an alkali storage battery or other such battery employing aqueous electrolyte, or may be a lithium secondary battery or lithium primary battery having lithium metal foil as negative electrode.

Furthermore, with regard to the components forming the alumina-containing layer, and, where the alumina-containing layer is formed on the electrode(s), the morphology of that electrode and the location at which the alumina-containing layer is formed thereon, there are a variety of embodiments within the purview of the technical idea of the present invention.

Figure 4:
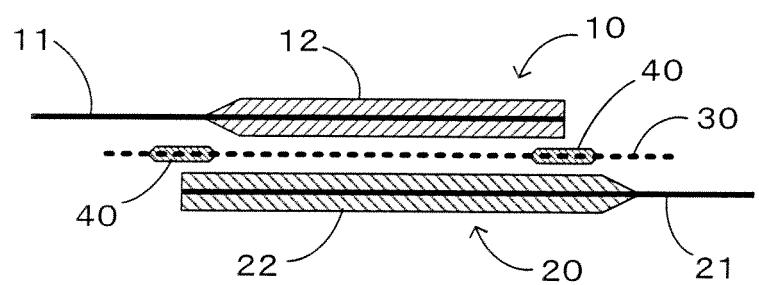
FIG. 4 is a drawing showing cross-sectional structure at a portion corresponding to a wound electrode assembly associated with another embodiment of the present invention.
Figure 5:
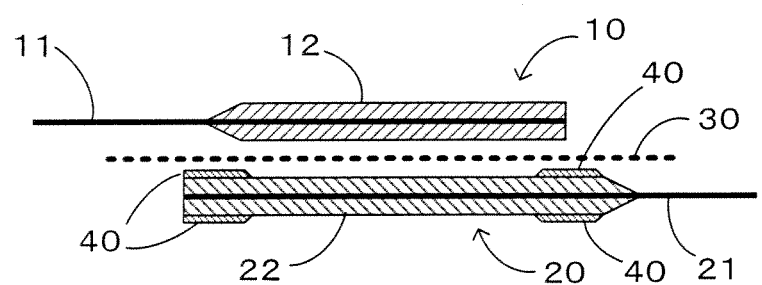
FIG. 5 is a drawing showing cross-sectional structure at a portion corresponding to a wound electrode assembly associated with another embodiment of the present invention.
Figure 6:
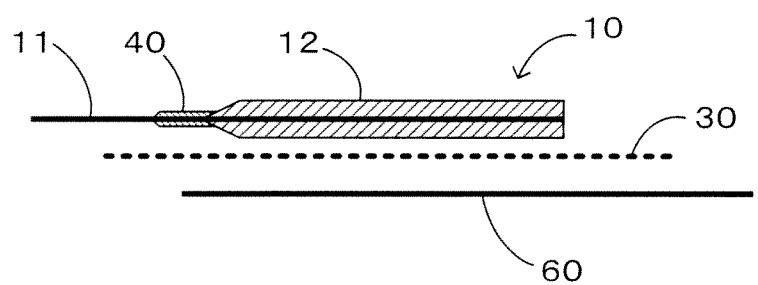
FIG. 6 is a drawing showing cross-sectional structure at a portion corresponding to a wound electrode assembly associated with another embodiment of the present invention.
Figure 7:
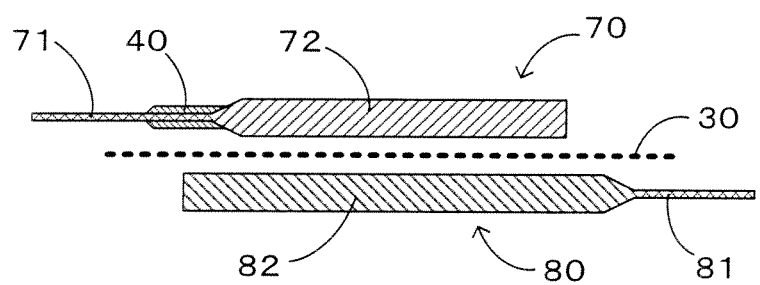
FIG. 7 is a drawing showing cross-sectional structure at a portion corresponding to a wound electrode assembly associated with another embodiment of the present invention.
Figure 8:
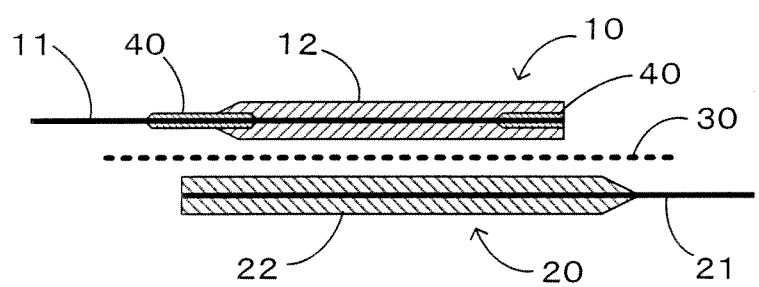
FIG. 8 is a drawing showing cross-sectional structure at a portion corresponding to a wound electrode assembly associated with another embodiment of the present invention.

In another embodiment, the alumina-containing layer may be formed on the separator. At FIG. 4, alumina-containing layer 40 is formed on each of the two faces of separator 30. It is also acceptable for alumina-containing layer 40 to be formed on only one face of separator 30.

At FIGS. 4 through 10, note that components identical to those at FIG. 3 have been given identical reference numerals.

Furthermore in another embodiment, the alumina-containing layer may be formed on the negative electrode. At FIG. 5, alumina-containing layer 40 is formed directly over negative electrode active material layer 22 on negative electrode 20. Here as well, the alumina-containing layer functions as short circuit prevention layer, and because the alumina-containing layer, which contains γ-alumina particles, has high bond strength with respect to the negative electrode active material layer, it is possible to achieve the benefit of reduced tendency to experience delamination and/or loss of the alumina-containing layer.

Furthermore, it is also possible for the electrodes that form the electrode assembly to be made up only of lithium metal and/or foil of metal(s) capable of forming alloy(s) with lithium. In the embodiment shown in FIG. 6, negative electrode 60 consists only of metal foil. Furthermore, at FIG. 6, while alumina-containing layer 40 is formed on positive electrode 10, this may alternatively or in addition be formed on negative electrode 60.

Furthermore, it is also possible for the electrodes that form the electrode assembly to be such that the current collectors thereof comprise metal foam that is filled with active material. In the embodiment shown in FIG. 7, positive electrode 70 and negative electrode 80 are formed such that current collectors comprising metal foam are filled with active material 72, 82. To permit connection with current collector terminals, there are locations (71, 81) at the end portions thereof that are not filled with active material and that are squashed, alumina-containing layer 40 being formed so as to be in direct contact with the current collectors at these locations.

Furthermore in another embodiment, the alumina-containing layer may be formed between the current collector foil and the active material layer. At FIG. 8, the alumina-containing layer 40 at the right side in the drawing is formed between positive electrode current collector foil 11 and positive electrode active material layer 12. At the edge of the active material layer and/or the portion that is cut together with the current collector foil following application of the active material layer, the active material tends to delaminate and/or become lost, this being due to weak bond strength between the active material layer and the current collector foil. At FIG. 8, alumina-containing layer 40 which contains γ-alumina particles is provided at such locations, and the resulting excellent bond strength between alumina-containing layer 40 and current collector foil 11, and between alumina-containing layer 40 and active material layer 12, causes there to be reduced tendency to experience delamination and/or loss of active material layer. Moreover, it is preferred that electroconductor material(s) be added to alumina-containing layer 40. This is to ensure that electrical conduction can take place between active material layer 12 and current collector foil 11, and to suppress reduction in efficiency of use of active material.

Figure 9:
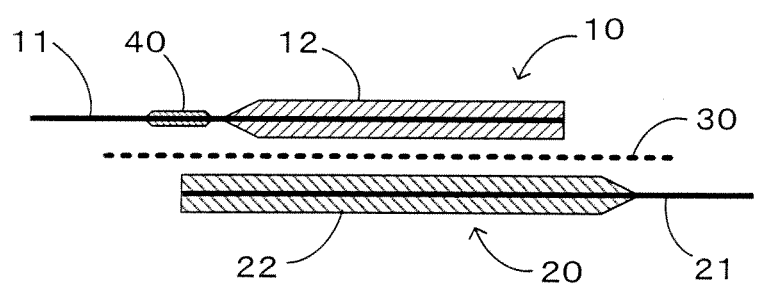
FIG. 9 is a drawing showing cross-sectional structure at a portion corresponding to a wound electrode assembly associated with another embodiment of the present invention.
Figure 10:
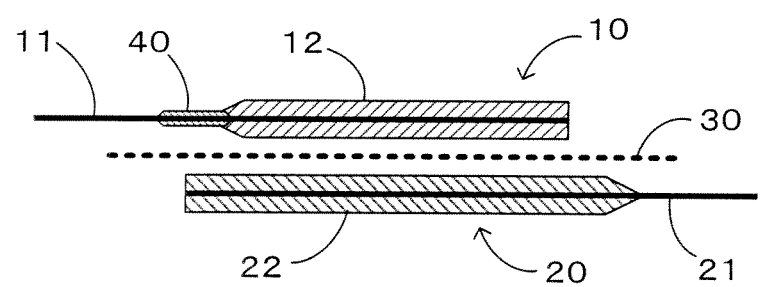
FIG. 10 is a drawing showing cross-sectional structure at a portion corresponding to a wound electrode assembly associated with another embodiment of the present invention.

Furthermore, whereas in the foregoing first embodiment the alumina-containing layer 40 was formed so as to be adjacent to and in direct contact with the active material layer 12, at FIG. 9 the alumina-containing layer 40 is not in contact with the active material layer 12. The operation and effect which are the object of the present invention may also be obtained when such a constitution is adopted.

Furthermore, whereas in the foregoing first embodiment the alumina paste was applied after application of the active material paste to the positive electrode current collector foil, it is also possible to reverse the order of application of the two pastes. At FIG. 10, alumina-containing layer 40 is formed so as to be in direct contact with the surface of positive electrode current collector foil 11, and moreover, active material layer 12 is formed so as to slightly cover the end portion of alumina-containing layer 40.

Furthermore, whereas in the first embodiment the alumina-containing layer was provided at a location on the positive electrode such that it was disposed so as to face, by way of intervening separator, the edge of the negative electrode active material layer, the alumina-containing layer may be provided in such fashion that not only is it disposed at a location so as to face the edge of the negative electrode active material layer but it also covers the entire positive electrode active material layer surface. As a result of providing the alumina-containing layer in such fashion that it covers the positive electrode active material layer surface, even where electrically conductive particulate or the like present within the battery causes penetration of the separator, it will be possible to prevent abnormal generation of heat due to short circuit between the positive electrode and the negative electrode. It is also possible for the alumina-containing layer to be provided in such fashion that it covers the entire surface of the separator and/or the entire surface of the negative electrode active material layer.

Exemplary Testing

Below, the benefit of causing the alumina-containing layer to contain γ-alumina particles in accordance with the present invention is described with reference to test results. In the following exemplary tests, a number of alumina pastes having different compositions were prepared, these were applied to aluminum foil employed as positive electrode current collector foil, and bond strength between the alumina-containing layer and the aluminum foil was measured.

Bond strength between alumina-containing layer and aluminum foil was evaluated based on peel strength obtained when a 180° peel strength test was performed. The aluminum foil was made to lie horizontally such that the alumina-containing layer faced upward, and adhesive tape 18 mm in width was applied to the alumina-containing layer. One end of the adhesive tape was folded back upon itself, and this was pulled 180° from, or in the reverse direction as, the direction in which it had been applied to the alumina-containing layer, to peel the alumina-containing layer off of the aluminum foil. The tape was then continued to be pulled in parallel fashion with respect to the aluminum foil so that the alumina-containing layer, now adhering to the tape, was topmost, the force required to pull the tape being measured with a force gauge (load measuring device), with the average value being reported as the peel strength.

Furthermore, in the descriptions at the respective exemplary tests, bulk density of alumina particles was measured using a Tap Denser KYT-4000 manufactured by Seishin Enterprise Co., Ltd. of Tokyo, Japan. Furthermore, specific surface area of alumina particles was measured using a QUADRASORB Surface Area Analyzer manufactured by Quantachrome Instruments of Boynton Beach, Fla., U.S.A. in accordance with the BET method involving adsorption of an inert gas.

At Exemplary Test 1, 2.1 kg of γ-alumina particles having a primary particle diameter median value (hereinafter abbreviated "particle diameter") of 5 nm, a specific surface area of 96 $m^2/g$, and a tap density of 0.04 $g/cm^3$ were mixed in and dispersed uniformly throughout a solution diluted by addition of 6.0 kg of NMP to 21.39 kg of NMP solution containing 12% polyvinylidene difluoride (PVDF) as binder (PVDF quantity=2.567 kg) to obtain a slurry-like alumina-containing paste. Here, because the NMP is ultimately evaporated away, content of PVDF in the alumina-containing layer becomes 2.567/(2.1+2.567)=55 wt %. The die coating method was employed to apply this paste at a thickness of 10 μm over a region having a width of 4.5 mm on aluminum foil of thickness 20 μm, and this was dried for 2 minutes at 140° C. Note that following drying the alumina-containing layer was not subjected to working by a press.

Exemplary Test 2 was carried out using the same materials and conditions as at Exemplary Test 1, except that γ-alumina particles identical to those employed at Exemplary Test 1 were in addition ground using a ball mill. Particle diameter of γ-alumina particles was 1 nm, specific surface area thereof was 130 $m^2/g$, and tap density thereof was 0.02 $g/cm^3$.

Exemplary Test 3 was carried out using the same materials and conditions as at Exemplary Test 1, except that the γ-alumina particles used were such that particle diameter was 7 nm, specific surface area was 234 $m^2/g$, and tap density was 0.08 $g/cm^3$.

Exemplary Test 4 was carried out using the same materials and conditions as at Exemplary Test 1, except that the γ-alumina particles used were such that particle diameter was 10 nm, specific surface area was 231 $m^2/g$, and tap density was 0.6 $g/cm^3$.

Exemplary Test 11 was carried out using the same materials and conditions as at Exemplary Test 1, except that the alumina-containing layer employed α-alumina particles having particle diameter 100 nm, specific surface area 14 $m^2/g$, and tap density 0.9 $g/cm^3$.

Exemplary Test 5 was carried out using the same materials and conditions as at Exemplary Test 1, except that content of PVDF in the alumina-containing layer was 60 wt %.

Exemplary Test 6 was carried out using the same materials and conditions as at Exemplary Test 1, except that content of PVDF in the alumina-containing layer was 50 wt %.

Exemplary Test 7 was carried out using the same materials and conditions as at Exemplary Test 1, except that content of PVDF in the alumina-containing layer was 45 wt %.

Exemplary Test 12 was carried out using the same materials and conditions as at Exemplary Test 1, except that content of PVDF in the alumina-containing layer was 40 wt %.

Exemplary Test 13 was carried out using the same materials and conditions as at Exemplary Test 1, except that content of PVDF in the alumina-containing layer was 35 wt %.

Exemplary Test 14 was carried out using the same materials and conditions as at Exemplary Test 1, except that polytetrafluoroethylene (PTFE) was employed instead of PVDF as binder for the alumina-containing layer.

Exemplary Test 15 was carried out using the same materials and conditions as at Exemplary Test 11, except that content of PVDF in the alumina-containing layer was 40 wt %.

Exemplary Test 16 was carried out using the same materials and conditions as at Exemplary Test 11, except that content of PVDF in the alumina-containing layer was 35 wt %.

Exemplary Test 17 was carried out using the same materials and conditions as at Exemplary Test 11, except that PTFE was employed instead of PVDF as binder for the alumina-containing layer.

Results are shown in TABLE 1. In the table, primary particle diameter is the median value obtained for primary particle diameter as measured using the aforementioned method. Furthermore, at peel strength, because the values that were directly measured were indicated in units of gram-force, these were converted to newtons (N) and shown to two decimal places. That is, because 1 gram-force is equal to $9.80665 \times 10^{-3}$ N, this means, e.g., at Exemplary Test 1, that 580 gram-force=5.69 N.

From the results of Exemplary Tests 1 through 4 and Exemplary Test 11, it is clear that peel strength was high when γ-alumina particles were used in the alumina-containing layer. Furthermore, it is clear that peel strength increased with decreasing alumina primary particle diameter, increasing BET specific surface area, and decreasing tap density. Peel strength was approximately 4 N or higher when primary particle diameter was 1 nm to 10 nm, and was approximately 5 N or higher when primary particle diameter was 1 nm to 7 nm. Peel strength was approximately 4 N or higher when tap density was 0.02 $g/cm^3$ to 0.6 $g/cm^3$.

Furthermore, it is also clear based upon comparison of the respective results at Exemplary Tests 12 through 14 and at Exemplary Test 15 through 17 as well, that peel strength was higher when γ-alumina particles were used in the alumina-containing layer.

Based upon comparison of Exemplary Test 1 and Exemplary Test 14, it is clear that peel strength was higher when PVDF was used as binder. Whereas peel strength was as high as approximately 5.7 N at Exemplary Test 1 (where PVDF was used as binder), peel strength was approximately 0.2 N at Exemplary Test 14 (where PTFE was used as binder).

Furthermore, when the samples prepared at Exemplary Test 1 and Exemplary Test 14 were allowed to stand for 180 days within electrolyte for use with a lithium ion battery at 65° C., the alumina-containing layer delaminated from the aluminum foil where the sample at Exemplary Test 14 was used. On the other hand, where the sample at Exemplary Test 1 was used, it was found upon measuring peel strength after this had been allowed to stand for 180 days that a peel strength of approximately 5.5 N had been maintained.

Based upon comparison of Exemplary Tests 1, 5 through 7, 12, and 13, it is clear that peel strength was high when content of PVDF binder was 45 wt % or higher. Peel strength was approximately 4 N or higher when content thereof was 45 wt % to 60 wt %, and was approximately 5 N or higher when content thereof was 50 wt % to 60 wt %.

TABLE 1

| | | Alumina | | | Binder | | Peel |
|---|---|---|---|---|---|---|---|
| | Crystal Structure | Primary Particle Diameter (nm) | BET Surface Area (m²/g) | Tap Density (g/cm³) | Type | Content (wt %) | Strength (N) |
| Exemplary Test 1 | γ | 5 | 96 | 0.04 | PVDF | 55 | 5.69 |
| Exemplary Test 2 | γ | 1 | 130 | 0.02 | PVDF | 55 | 4.90 |
| Exemplary Test 3 | γ | 7 | 234 | 0.08 | PVDF | 55 | 4.90 |
| Exemplary Test 4 | γ | 10 | 231 | 0.6 | PVDF | 55 | 3.92 |
| Exemplary Test 11 | α | 100 | 14 | 0.9 | PVDF | 55 | 0.69 |
| Exemplary Test 5 | γ | 5 | 96 | 0.04 | PVDF | 60 | 4.90 |
| Exemplary Test 6 | γ | 5 | 96 | 0.04 | PVDF | 50 | 5.69 |
| Exemplary Test 7 | γ | 5 | 96 | 0.04 | PVDF | 45 | 3.92 |
| Exemplary Test 12 | γ | 5 | 96 | 0.04 | PVDF | 40 | 0.69 |
| Exemplary Test 13 | γ | 5 | 96 | 0.04 | PVDF | 35 | 0.20 |
| Exemplary Test 14 | γ | 5 | 96 | 0.04 | PTFE | 55 | 0.20 |
| Exemplary Test 15 | α | 100 | 14 | 0.9 | PVDF | 40 | 0.30 |
| Exemplary Test 16 | α | 100 | 14 | 0.9 | PVDF | 35 | 0.10 |
| Exemplary Test 17 | α | 100 | 14 | 0.9 | PTFE | 55 | 0.10 |

What is claimed is:

1. A battery comprising:
    a laminated electrode assembly in which a positive electrode, a negative electrode, and a separator are laminated together; and
    an alumina-containing layer comprising γ-alumina particles formed on at least one member selected from among the group consisting of the positive electrode, the negative electrode, and the separator,
    wherein a primary particle diameter median value of the γ-alumina particles is not less than 1 nm and not more than 100 nm,
    at least one of the positive electrode and the negative electrode includes a current collector and an active material layer,
    the active material layer includes a tapered zone having a thickness which tapers off, and a bulk zone,
    a thickness of the alumina-containing layer is less than a thickness of the bulk zone of the active material layer, and wherein
    a specific surface area of the γ-alumina particles is in a range from 96 m²/g to 234 m²/g.

2. A battery according to claim 1, wherein the laminated electrode assembly comprises a wound electrode assembly.

3. A battery according to claim 1, wherein the battery comprises a nonaqueous electrolyte battery.

4. A battery according to claim 3, wherein the battery comprises a lithium ion battery.

5. A battery according to claim 1, wherein the alumina-containing layer is formed on at least either the positive electrode or the negative electrode.

6. A battery according to claim 5, wherein the alumina-containing layer is formed on at least the positive electrode.

7. A battery according to claim 5, wherein the alumina-containing layer is disposed so as to face, by way of the separator which intervenes therebetween, an edge of the active material layer of a second electrode of different polarity from a first electrode on which said alumina-containing layer is formed, and the first electrode and the second electrode are in mutually neighboring relationship by way of the separator which intervenes therebetween.

8. A battery according to claim 5, wherein an electrode on which the alumina-containing layer is formed includes the current collector and the active material layer, and said alumina-containing layer is formed so as to be in direct contact with a surface of the current collector.

9. A battery according to claim 8, wherein the current collector comprises a current collector foil consisting substantially of metal foil.

10. A battery according to claim 9, wherein the alumina-containing layer is formed so as to be adjacent to and in direct contact with the active material layer, and so as to be in direct contact with a surface of the current collector foil.

11. A battery according to claim 8, wherein the current collector consists substantially of aluminum.

12. A battery according to claim 9, wherein a thickness of the alumina-containing layer is less than a thickness of the active material layer formed on a same face of the current collector foil on which said alumina-containing layer is formed.

13. A battery according to claim 9, wherein the active material layer is subjected to working by a press, and the alumina-containing layer is not subjected to working by the press.

14. A battery according to claim 1, wherein the alumina-containing layer includes polyvinylidene difluoride.

15. A battery according to claim 14, wherein a content of the polyvinylidene difluoride within the alumina-containing layer is not less than 45 wt % and not more than 60 wt %.

16. A battery according to claim 1, wherein a primary particle diameter median value of the γ-alumina particles is not less than 1 nm and not more than 10 nm.

17. A battery according to claim 1, wherein a tap density of the γ-alumina particles is not less than 0.02 g/cm$^3$ and not more than 0.6 g/cm$^3$.

18. A battery according to claim 1, wherein a first electrode on which the alumina-containing layer is formed has the active material layer, and the current collector which consists substantially of metal foil, the alumina-containing layer is formed so as to be adjacent to and in direct contact with the active material layer and in direct contact with a surface of the current collector foil, and is disposed so as to face, by way of the separator which intervenes therebetween, an edge of the active material layer of a second electrode of different polarity from the first electrode on which said alumina-containing layer is formed, and the first electrode and the second electrode are in mutually neighboring relationship by way of the separator which intervenes therebetween.

19. A battery according to claim 18, wherein the alumina-containing layer includes polyvinylidene difluoride.

20. A battery according to claim 19, wherein a content of the polyvinylidene difluoride within the alumina-containing layer is not less than 45 wt % and not more than 60 wt %.

* * * * *